US012328203B2

(12) United States Patent
Prentice

(10) Patent No.: US 12,328,203 B2
(45) Date of Patent: Jun. 10, 2025

(54) LOW CLOCK RATE MIL-STD-1553B DECODER FOR FIELD PROGRAMMABLE GATE ARRAYS

(71) Applicant: Government of the United States, as represented by the Secretary of the Air Force, Wright-Patterson AFB, OH (US)

(72) Inventor: David Prentice, Springboro, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 496 days.

(21) Appl. No.: 17/820,948

(22) Filed: Aug. 19, 2022

(65) Prior Publication Data

US 2023/0055859 A1 Feb. 23, 2023

Related U.S. Application Data

(60) Provisional application No. 63/235,245, filed on Aug. 20, 2021.

(51) Int. Cl.
*H04L 12/40* (2006.01)
(52) U.S. Cl.
CPC .............................. *H04L 12/4013* (2013.01)

(58) Field of Classification Search
CPC ............ H04L 12/4013; G06F 13/4018; G06F 13/1694; G06F 13/124; G06F 13/4022
See application file for complete search history.

(56) References Cited

U.S. PATENT DOCUMENTS

| | | | |
|---|---|---|---|
| 6,212,224 B1 | 4/2001 | Cammarota et al. | |
| 7,152,134 B2 | 12/2006 | Kinstler | |
| 7,865,760 B2 | 1/2011 | Carlson et al. | |
| 9,875,200 B2 | 1/2018 | Huber | |
| 10,467,174 B2 | 11/2019 | Eckhardt et al. | |
| 2003/0033059 A1* | 2/2003 | Ebert | H04L 69/08 701/3 |
| 2009/0132748 A1 | 5/2009 | Sheffield | |
| 2018/0285300 A1* | 10/2018 | Prentice | G06F 13/1694 |

* cited by examiner

*Primary Examiner* — Ernest Unelus
(74) *Attorney, Agent, or Firm* — AFMCLO/JAZ; Larry L. Huston

(57) ABSTRACT

A decoder for the MIL-STD-1553B bus which operates at a slower clock rate than the 40 MHz industry standard clock rate. This embodiment uses a 10 MHz clock rate. Because the clock rate is slower than the 40 MHz clock rate, the invention will inherently use less power. Additional features of this invention include: flexible resolution timestamp input, error checking and reporting throughout the decode process and 32 bit buffered parallel output of the bus controller and remote terminal communication. In another embodiment the decoder has a plurality of n ancillary clocks which provide partial state timestamps, which are summable to create a system timestamp.

18 Claims, 11 Drawing Sheets

| Input Signal | Description |
|---|---|
| RX_DATA | Positive differential eqfferential equivalent input from transceiver |
| RX_DATA_N | Negative differential equivalent input from transceiver |
| PAUSE_DECODER | Pauses the processing of the decoder |
| PACKET_HOLD | Blocks the decoded traffic from coming out of the component |
| TIMESTAMP | Timestamp of the rising edge of BC or RT sync |

| STATE | DESCRIPTION/ACTIVITY |
|---|---|
| IDLE - | no activity (initial startup state) |
| HEADER_SYNC - | validates bus controller sync message from specification |
| DECODE_BC - | decodes the bus controller message according to the specification |
| DECODE_DATA - | decodes the data words from the BC or RT |
| RT_SYNC - | validates the timing of the remote terminal sync message |
| RT_REPLY_WAIT - | measures the time between the end of the BC message and the RT response |
| TRANSFER_WAIT - | validates the external data receiving component is ready |
| TRANSFER DECODE | pushed the decoded traffic out of the component |

FIG. 8

| Row | Col A | Col B | Col C | Col D | Bit Number 31–0 | Notes |
|---|---|---|---|---|---|---|
| | Vampire Ethernet Parser | | | | | |
| | 1/18/2019 | | | | | |
| | Ethernet Header 0x7887 | | | | | |
| | | | | | 31 30 29 28 27 26 25 24 23 22 21 20 19 18 17 16 15 14 13 12 11 10 9 8 7 6 5 4 3 2 1 0 | |
| 0 | Bus Letter | 9 | 0 | 9 | 8 high bits of pkt cntr  0 0 0 0 0 0 0 0 | * Bus letter is ether A or B |
| 1 | 8 low bits of pkt counter | | error bits | place hold | 0  0 0 0 0 0 0 0 0 | |
| 2 | 24 High bits of 44 bit timestamp | | | | 0 0 0 0 0 0 0 0 | * Timestamp is 5 ns per bit |
| 3 | 20 low bits of 44 bit timestamp | | | Fine Rez | 0 0 0 0 0 0 0 0 | * Fine rez is 0.5 ns per bit |
| 4 | 24 bits of normal message reply time | | | | 0 0 0 0 0 0 0 0 | * Replay time is 5 ns per bit |
| 5 | 24 bits of RT 2 RT reply time | | | | 0 0 0 0 0 0 0 0 | * RT 2 RT is related to the commanded RT |
| 6 | Sync | Decoded comm message (17 bits) RT 2 RT | | | 0 0 0 0  0 0 0 0 0 0 0 0 | * RT 2 RT is related to the commanded RT |
| 7 | Sync | Decoded comm message (17 bits) | | | 0 0 0 0  0 0 0 0 0 0 0 0 | |
| 8 | Sync | Decoded status message (17 bits) RT 2 RT | | | 0 0 0 0  0 0 0 0 0 0 0 0 | * RT 2 RT is related to the commanded RT |
| 9 | Sync | Decoded status message (17 bits) | | | 0 0 0 0  0 0 0 0 0 0 0 0 | |
| 10 | Sync | Decoded Data 0 | | | 0 0 0 0  0 0 0 0 0 0 0 0 | * All syncs are 010 for cmd, 000 for data |
| 11 | Sync | Decoded Data 1 | | | 0 0 0 0  0 0 0 0 0 0 0 0 | |
| 12 | Sync | Decoded Data 2 | | | 0 0 0 0  0 0 0 0 0 0 0 0 | |
| 13 | Sync | Decoded Data 3 | | | 0 0 0 0  0 0 0 0 0 0 0 0 | |
| 14 | Sync | Decoded Data 4 | | | 0 0 0 0  0 0 0 0 0 0 0 0 | |
| 15 | Sync | Decoded Data 5 | | | 0 0 0 0  0 0 0 0 0 0 0 0 | |
| 16 | Sync | Decoded Data 6 | | | 0 0 0 0  0 0 0 0 0 0 0 0 | |
| 17 | Sync | Decoded Data 7 | | | 0 0 0 0  0 0 0 0 0 0 0 0 | |
| 18 | Sync | Decoded Data 8 | | | 0 0 0 0  0 0 0 0 0 0 0 0 | |
| 19 | Sync | Decoded Data 9 | | | 0 0 0 0  0 0 0 0 0 0 0 0 | |
| 20 | Sync | Decoded Data 10 | | | 0 0 0 0  0 0 0 0 0 0 0 0 | |
| 21 | Sync | Decoded Data 11 | | | 0 0 0 0  0 0 0 0 0 0 0 0 | |
| 22 | Sync | Decoded Data 12 | | | 0 0 0 0  0 0 0 0 0 0 0 0 | |
| 23 | Sync | Decoded Data 13 | | | 0 0 0 0  0 0 0 0 0 0 0 0 | |
| 24 | Sync | Decoded Data 14 | | | 0 0 0 0  0 0 0 0 0 0 0 0 | |
| 25 | Sync | Decoded Data 15 | | | 0 0 0 0  0 0 0 0 0 0 0 0 | |
| 26 | Sync | Decoded Data 16 | | | 0 0 0 0  0 0 0 0 0 0 0 0 | |
| 27 | Sync | Decoded Data 17 | | | 0 0 0 0  0 0 0 0 0 0 0 0 | |
| 28 | Sync | Decoded Data 18 | | | 0 0 0 0  0 0 0 0 0 0 0 0 | |
| 29 | Sync | Decoded Data 19 | | | 0 0 0 0  0 0 0 0 0 0 0 0 | |
| 30 | Sync | Decoded Data 20 | | | 0 0 0 0  0 0 0 0 0 0 0 0 | |
| 31 | Sync | Decoded Data 21 | | | 0 0 0 0  0 0 0 0 0 0 0 0 | |
| 32 | Sync | Decoded Data 22 | | | 0 0 0 0  0 0 0 0 0 0 0 0 | |
| 33 | Sync | Decoded Data 23 | | | 0 0 0 0  0 0 0 0 0 0 0 0 | |
| 34 | Sync | Decoded Data 24 | | | 0 0 0 0  0 0 0 0 0 0 0 0 | |
| 35 | Sync | Decoded Data 25 | | | 0 0 0 0  0 0 0 0 0 0 0 0 | |
| 36 | Sync | Decoded Data 26 | | | 0 0 0 0  0 0 0 0 0 0 0 0 | |
| 37 | Sync | Decoded Data 27 | | | 0 0 0 0  0 0 0 0 0 0 0 0 | |
| 38 | Sync | Decoded Data 28 | | | 0 0 0 0  0 0 0 0 0 0 0 0 | |
| 39 | Sync | Decoded Data 29 | | | 0 0 0 0  0 0 0 0 0 0 0 0 | |
| 40 | Sync | Decoded Data 30 | | | 0 0 0 0  0 0 0 0 0 0 0 0 | |
| 41 | Sync | Decoded Data 31 | | | 0 0 0 0  0 0 0 0 0 0 0 0 | |
| 42 | Reserved | | | | 0 0 0 0  0 0 0 0 0 0 0 0 | |
| 43 | Reserved | | | | 0 0 0 0  0 0 0 0 0 0 0 0 | |
| 44 | Reserved | | | | | |

* Errors: 0x0 - No errors, 0x2 - Cmd error, 0x3 - Data sync error, 0x5 - Transfer, 0x7 No reply

FIG. 9

| Error | 3 Bit Code |
|---|---|
| No error | 000 |
| Bus controller sync error | 001 |
| Bus controller error | 010 |
| Remote terminal error | 011 |
| Word count error | 100 |
| Bit missing error | 101 |
| No reply | 111 |

93

| Timestamp/State | Clock Divider (1/10 = 1ns) | Partial Clock Time (ns) |
| --- | --- | --- |
| 10000 | 0/10 | 1 |
| 11000 | 1/10 | 2 |
| 11100 | 2/10 | 3 |
| 11110 | 3/10 | 4 |
| 11111 | 4/10 | 5 |
| 01111 | 5/10 | 6 |
| 00111 | 6/10 | 7 |
| 00011 | 7/10 | 8 |
| 00001 | 8/10 | 9 |
| 00000 | 9/10 | 0 |

FIG. 15

LOW CLOCK RATE MIL-STD-1553B DECODER FOR FIELD PROGRAMMABLE GATE ARRAYS

CROSS REFERENCE TO RELATED APPLICATION

This application claims priority to and the benefit of U.S. Application No. 63/235,245 filed Aug. 20, 2021, the disclosure of which is incorporated herein by reference.

STATEMENT OF GOVERNMENT INTEREST

The invention described and claimed herein may be manufactured, licensed and used by or for the Government of the United States of America for all government purposes without the payment of any royalty.

FIELD OF THE INVENTION

The present invention relates to low clock rate decoders, more particularly to low clock rate decoders which meet MIL-STD-1553B, and even more particularly to low clock rate decoders which meet MIL-STD-1553B at clock rates less than or equal to 15 MHz.

BACKGROUND OF THE INVENTION

In 1968 the Aerospace Branch of the Society of Automotive Engineers (SAE) drafted the first multiplex data bus standard, in response to increasingly burdensome and complicated wiring systems. In 1973 this SAE standard became the foundation of the US Air Force MIL-STD-1553. Military services and contractors adopted MIL-STD-1553 as an avionics data bus, in part due to its highly reliable, serial, 1 Mbps transfer rate and low error rate on a dual-redundant architecture.

In 1975 an upgraded MIL-STD-1553A was released, and modified to MIL-STD-1553B in 1978. The intent of the updated MIL-STD-1553B standard was to define how options should function, to improve compatibility among manufacturers. From 1980 to 1996 four Notices were released, updating design specifications and defining how certain bus options are to be used.

Today MIL-STD-1553B is a military standard that defines mechanical, electrical, and operating characteristics of a serial data communication bus for the U.S. Department of Defense. MIL-STD-1553B is now commonly used for data handling in both military and civilian applications in avionics, aircraft, and spacecraft. MIL-STD-1553B was first used in the F-16 fighter aircraft and is now widely used by all branches of the U.S. military and NATO. Today an estimated 30,000 aircraft, commercial ships, military ships and various industrial applications use MIL-STD-1553B. Furthermore, there are bridges between MIL-STD-1553B and Gigabit Ethernet that allow MIL-STD-1553B to transfer data to the currently most widely used networking standard.

A MIL-STD-1553B system typically uses a dual redundant, balanced-line, physical layer with a differential network interface with time-division multiplexing, half-duplex, command/response data communication protocol with up to 32 remote terminal devices. More particularly, MIL-STD-1553B defines operation and information flow on a multiplex data bus and the data bus structure for interconnection of up to 31 remote terminal (RT) devices. A single controller device on the bus initiates the command/response communication with the remote devices. The remote and control devices are interconnected over two, separate buses. Normal operation involves only the primary bus with the secondary bus available as redundant backup in the event of primary bus damage or failure. Standardization of specifications for a military data bus provides advantages of: size/weight savings of interconnected device/cabling and reduced development/modification costs with compatible devices.

A MIL-STD-1553B device can serve as bus controller, bus monitor, or remote terminal. But not all interfaces support all three functions. When operating as a bus controller, the device must be capable of detailed transmission scheduling (including major and minor frame timing), which is usually is best performed in hardware rather than via software timing.

The MIL-STD-1553B major minor frame scheduler is designed to run cyclic, multi-rate commands over and over again at preselected frequencies. High-speed, precise timing on a UEI MIL-STD-1553B I/O board is not determined by the application programming interface (API), but by a field programmable gate array (FPGA) on the board.

In avionics systems the MIL-STD-1553B bus is implemented to communicate between line replaceable units (LRU). In MIL-STD-1553B bus communication, all messaging is initiated by the bus controller. The MIL-STD-1553B bus is generally intended to be used for command and control and not for streaming high volumes of multimedia data Despite the MIL-STD-1553B being traceable to 1968, known problems persist. Four example, only a single 1 Mbps data rate is specified in order to meet the MIL-STD-1553B specifications. Commercially available bus systems oversample at a 40 MHz clock rate in order to assure adequate resolution. But this 40 MHz clock rate is unnecessary for many tasks, and thereby consumes undue power. Undue power consumption shortens battery life or reduces alternative electrical load options from a mains power source. Accordingly there is a long felt for a new approach, as presented herein.

SUMMARY OF THE INVENTION

In one embodiment the invention is a decoder for the MIL-STD-1553B bus which operates at a slower clock rate than the 40 MHz industry standard clock rate. This embodiment uses a 10 MHz clock rate. Because the clock rate is slower than the 40 MHz clock rate, the invention will inherently use less power. Additional features of this invention include: flexible resolution timestamp input, error checking and reporting throughout the decode process and 32 bit buffered parallel output of the bus controller and remote terminal communication. In another embodiment the decoder has a plurality of n ancillary clocks which provide partial state timestamps, which are summable to create a system timestamp.

BRIEF DESCRIPTION OF THE DRAWINGS

FIG. 8 is a table of operable states for the state machine.

FIG. 9 is a table of exemplary sequential output for decoder RAM.

FIG. 15 is a table of equivalent values of partial timestamps.

DETAILED DESCRIPTION OF THE INVENTION

Figure 1A:
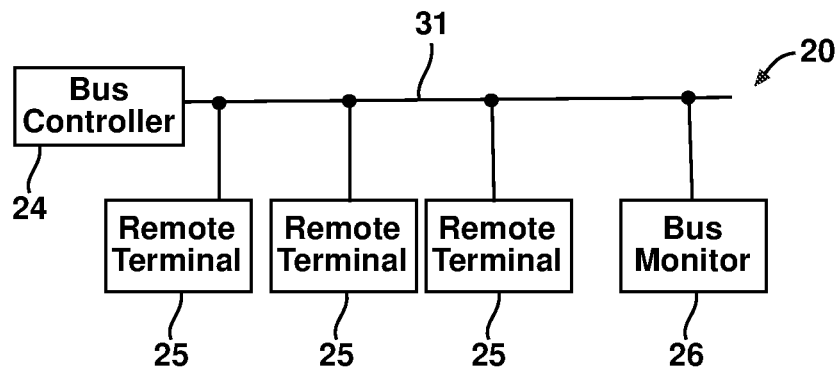
FIG. 1A is an exemplary embodiment of a MIL-STD-1553B bus.
Figure 1B:
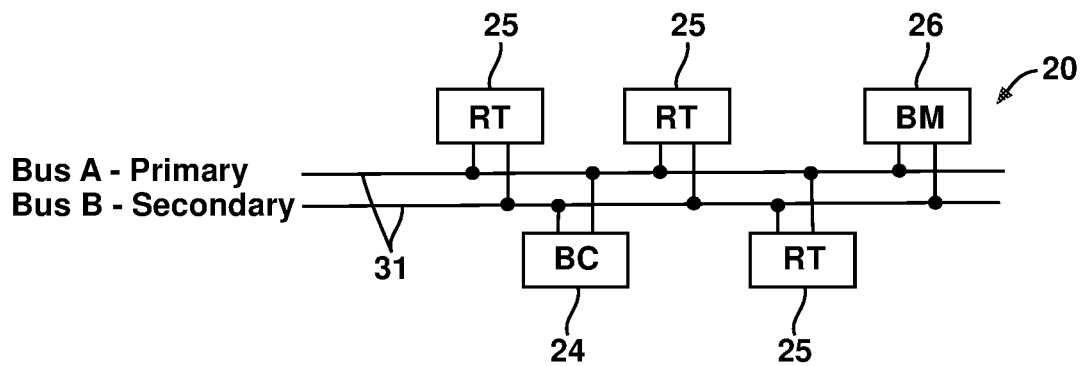
FIG. 1B is an exemplary embodiment of a MIL-STD-1553B bus system having redundant Bus A and Bus B.
Figure 1C:
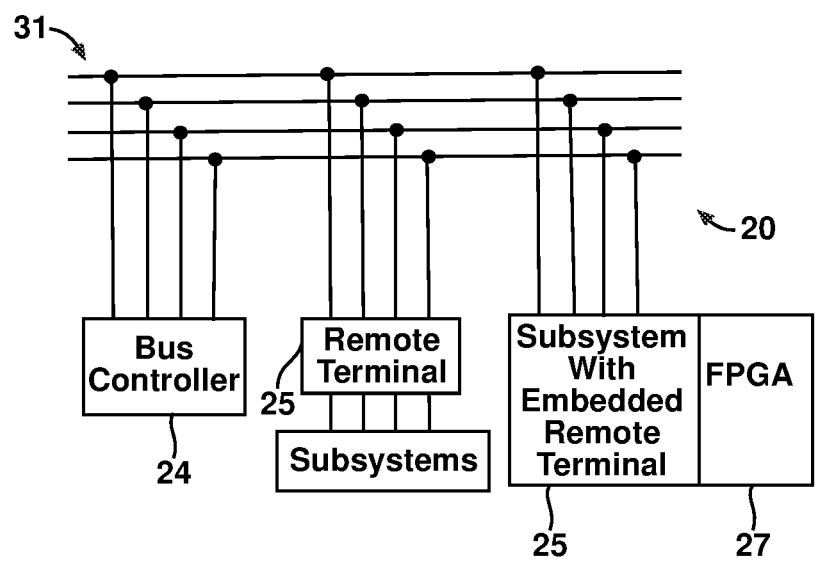
FIG. 1C is an exemplary embodiment of a MIL-STD-1553B bus system having redundant Bus A and Bus B.

Referring to FIG. 1A, FIG. 1B and FIG. 1C, single MIL-STD-1553B (hereinafter 1553) bus 20 consists of a shielded, twisted-wire pair with 70-85 ohm impedance at 1 MHz. If a coaxial connector is used, the center pin is used for a high Manchester bi-phase signal. All transmitter and receiver devices connect to the bus 20 either through coupling transformers or directly through stub connectors and isolation transformers, as shown below. Stubs are typically a maximum of 30 cm in length for direct coupling and a maximum of 6 m feet for transformer coupling. To limit reflections, the data bus 20 is preferably terminated by resistors equal to the cable characteristic impedance (within ±2%). Each transceiver is also connected in the same way to the second (redundant) bus 20. Each channel is an independent 1553 system that supports Bus A 20 and Bus B 20.

All 1553 messages on either bus 20 contain one or more 16-bit 40 words 30, classified as command, data, or status word 38 types. Each word 30 is preceded by a 3 microsecond clock 50 sync pulse 51 and is followed by an odd parity bit 40. The sync pulse 51 is 1.5 microsecond low followed by 1.5 microsecond high and cannot occur in a Manchester code, to therefore be unique. The words 30 in a message are transmitted with no gap between words 30, but a 4 microsecond gap is inserted between successive messages. All devices should start transmitting a response to a command within 4 to 12 microseconds. If messages do not start transmitting within 14 microseconds, they are considered to have not received the command message.

Figure 2:
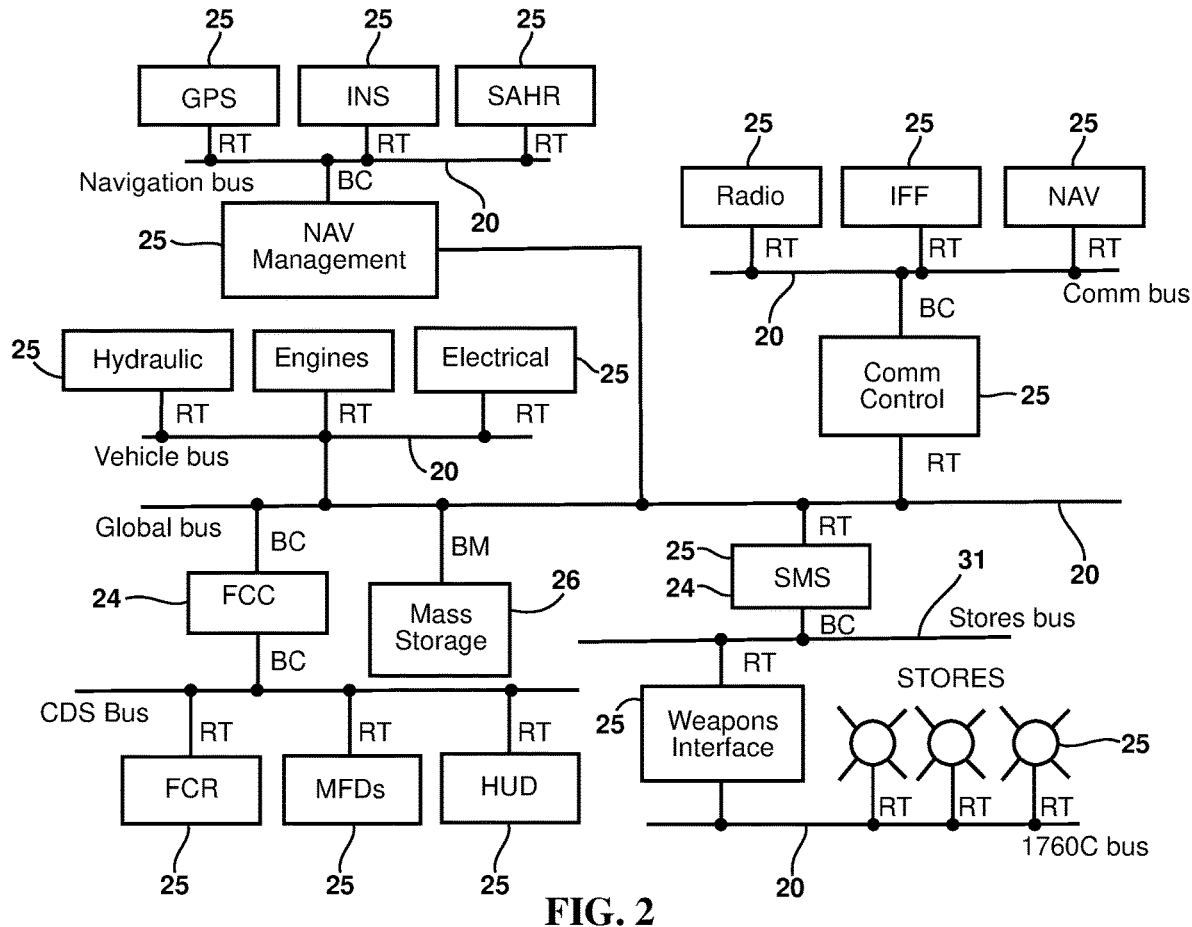
FIG. 2 is an exemplary embodiment of a MIL-STD-1553B bus system having multiple topologies.

Referring to FIG. 2, multiple level topologies may be designed by interconnecting plural single level buses 20 so data from one bus 20 can be transferred onto another bus 20. Buses 20 interconnected in a multiple level topology can have equal control over data flow, which promotes autonomy for each bus 20 with mutual isolation between the buses 20. A typical hierarchical format between multiple level buses 20 establishes local (subordinate) buses 20 and global (superior) buses 20, with the global bus 20 having control over local, subordinate buses.

There are three types of operating nodes for 1553 bus 20: a bus controller (BC) 24, a remote terminal (RT) 25 and a bus monitor (BM) 26. Each node has a separate function.

A bus controller 24 initiates all messages, traffic and commands the remote terminals 25 to transmit/receive data. The main function of the bus controller 24 is to provide data flow control for all transmissions on the bus 20. All information is communicated in a command/response mode, i.e. the BC 24 sends a command to the RTs 25, which reply with a response. Under MIL-STD-1553B, the bus controller 24 is the sole control of information transmission on the bus 20 and shall initiate all transmission. The bus 20 can support multiple BCs 24, but only one BC 24 can be active at a time. Normal BC 24 data flow control includes transmitting commands to RTs 25 at predetermined time intervals. The commands may include data and/or requests for data, including status, from RTs 25. The BC 24 has control to modify the flow of bus 20 data based on changes in the operating environment. Such modifications may be in response to an air-to-ground attack mode changing to air-to-air, vice-versa, the failure mode of a hydraulic system, etc. The BC 24 is responsible for detecting these changes and initiating action to counter them. Error 93 detection may require the BC 24 to attempt communications to the RT 25 on a redundant, backup bus 20.

A data bus 20 carries the data between the processor and other components. The data bus 20 is bidirectional. The control bus 20 carries control signals from the processor to other components. The control bus 20 also carries the pulse 51 of clock 50.

A remote terminal 25 interfaces the 1553 bus 20 and a subsystem bridge to other 1553 busses 20. The remote terminal 25 responds to the bus controller 24. Each remote terminal 25 has a unique address. The remote terminal 25 is a device designed to interface various subsystems with the 1553 data bus 20. The interface device may be embedded within the subsystem itself or be an external interface to tie a non-1553 compatible device to the bus 20. As a function of the interface requirement, the RT 25 receives and decodes commands from the BC 24, detects errors 93 and reacts to detected errors 93. The RT 25 should be able to properly handle both protocol errors 93, e.g. missing data, extra words 30, and electrical errors 93, e.g. waveform distortion, rise time violations. RTs 25 are typically the largest segment of bus 20 components. The RT 25 characteristics allow for up to 31 remote terminals 25 to be connected to the data bus 20. Each remote terminal 25 can further have 31 subaddresses. Remote terminals 25 do not respond unless first contacted by the bus controller 24 and specifically commanded to transmit.

The bus monitor (BM) 26 listens to all messages on the bus 20 and records selected activities. The BM 26 is a passive device that collects data for real-time or post capture analysis. The BM 26 can store all or portions of traffic on the bus 20, including electrical and protocol errors 93. BMs 26 are typically used for instrumentation and data bus 20 testing. The BM 26 does not transmit messages on the bus 20. The BM 26 monitors and records messages transmitted on the bus 20 without disrupting other devices. A BM 26 can also record selected subsets of the messages on the bus 20.

The 1553 bus 20 has a fixed bit 40 rate of 1 MB per second. Communication is a half-duplex. The physical cabling may be a Twinax shielded cable available from Remington Industries of Johnsburg, IL with 78 ohm termination resistors. There are two common methods for connecting a node 29D, 29T to the bus 20, direct coupling and transformer coupling.

Figure 3A:
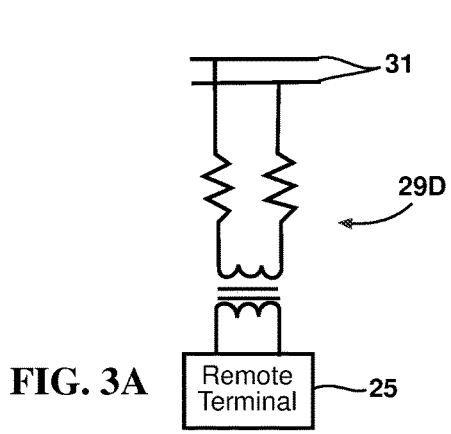
FIG. 3A is an exemplary direct coupling node.

Referring to FIG. 3A, in direct coupling the node 29D is generally less than 30 cm from the bus 20. Direct coupling nodes 29D are wired directly to the bus 20 cabling. Isolation resistors and a transformer are internal to the terminal device and typically do not require additional coupling hardware. Isolation resistors provide some protection for the main bus 20 in the event of a stub or terminal short. Direct coupling is susceptible to a terminal short which could disable the entire bus 20. Direct stubs may also result in significant impedance mismatches on the bus 20.

Figure 3B:
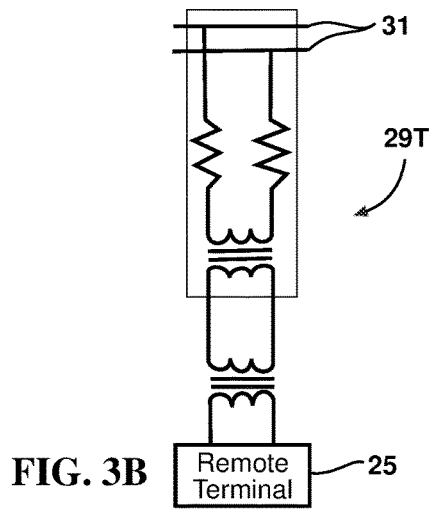
FIG. 3B is an exemplary transformer coupling node.

Referring to FIG. 3B, in transformer coupling, also known as long stub, the node 29T is preferably less than 6 m from the bus 20. Transformer coupling utilizes a second isolation transformer, located external to the terminal device, in its own housing with the isolation resistors. Transformer coupling extends the stub length and provides electrical isolation, better impedance matching and higher noise rejection characteristics than direct coupling. The improved electrical isolation reduces terminal faults and stub impedance mismatches. Transformer coupling is often preferred over direct coupling due to improved signal integrity and noise tolerance.

Figures 4, 5:
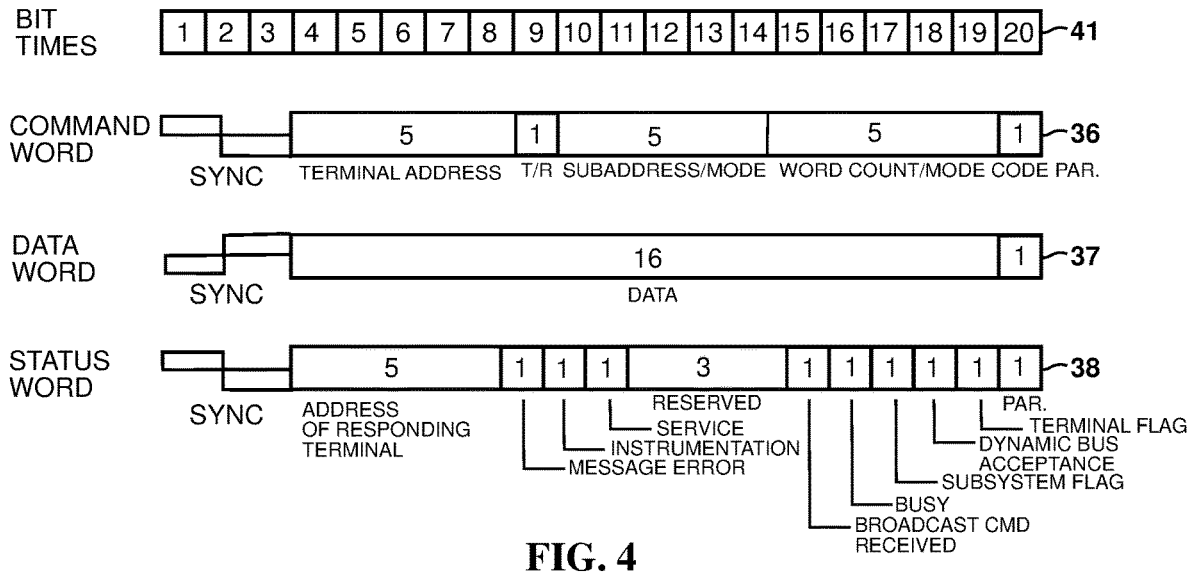
FIG. 4 is a layout of command words, data words and status words.
FIG. 5 is a table of signals for the MIL-STD-1553B decoder.

Referring to FIG. 4 the 1553 standard defines three word 30 types: command word 36, data words 37 and status words 38 having bit times 41 as needed. Each such type of word 36, 37, 38 has a specific format within a common structure. All such words 36, 37, 38 are 20 bits 40 in length and the first three bits 40 are a synchronization field, which enables the decoding clock 50 to re-sync at the beginning of each new word 30. The next 16 bits 40 contain the information, in a format that varies with the word 30 type. The last bit 40 in the word 30 is a parity bit 40, which is based on odd parity for a single word 30.

All bit 40 encoding is based on bi-phase Manchester II format, which provides a self-clocking waveform. The signal is symmetrical about zero and is therefore compatible with transformer coupling. In Manchester coding, signal transitions occur only at the center of a bit 40 time. A logic "0" is defined as a transition from negative to positive level; a logic "1" is the reverse. Voltage levels on the bus 20 are not the information signal. Instead all information is contained in the timing and direction of the zero crossings of the signal on the bus 20.

The terminal hardware provides the encoding and decoding of the various word 30 types. The encoder also calculates parity. For received messages, the decoder 28 signals the logic what sync type a word 30 is and whether or not parity is valid. For transmitted messages, input to the encoder defines what sync type to place at the beginning of a word 30. The encoder calculates parity automatically for each word 30.

A command word 36 format uses the first 5 bits 40 for the address (0 to 31) of the remote terminal 25. The sixth bit 40 is 0 for Receive and 1 for Transmit. The next 5 bits 40 indicate the subaddress/mode code bits 40. If this field is a 00000B or 11111B, the command is a Mode Code Command. All other bits 40 direct the data to specific functions in the subsystem. The next 5 bits 40 define the word 30 count or mode code to be performed. If this field is 00000B or 1111B, the field defines a mode code to be performed. If it is not, the field defines the number of data words 37 to be transmitted or received (depending on the T/R bit 40). For example, a word count field of 00000B means 32 data words 37. The last bit 40 is word parity. Only odd parity is used.

A data word 37 contains the information being transferred in a message. The first 3 bit 40 times contain a data sync, which is opposite to that used for a command or status word 38. Data words 37 can be transmitted by either a remote terminal 25 (transmit command) or a bus controller 24 (receive command). The remote terminal 25 is the reference point.

The next 16 bits 40 may be used however the designer wishes. The only standard requirement is that the most significant bit 40 must be transmitted first. The last bit 40 is an odd parity bit 40.

A remote terminal 25 responds to a valid message by transmitting a status word 38. The status word 38 tells the bus controller 24 whether or not a message was received properly and the state 52 of the remote terminal 25.

The status word 38 is cleared by receiving a valid command word 36. After the status word 38 is cleared, the bits 40 are set again if the conditions that set the bits 40 initially still exist. If an error 93 is detected in the data, the message error 93 bit 40 is set and transmission of the status word 38 is suppressed. Transmission of the status word 38 is also suppressed whenever a broadcast message is received.

The first 5 bits 40 of the status word 38 (bits 40 numbered 4-8) are the terminal address. The remote terminal 25 sets these bits 40 to the address to which it has been programmed. The bus controller 24 examines these bits 40 to ensure that the responding terminal is the one to which the command word 36 was addressed.

The next bit 40 (9) is the message error 93 bit 40, which is set by the terminal on detection of an error 93 or an invalid message. Whenever the error 93 bit 40 is set, none of the data received in the message is used. When an error 93 is detected, the remote terminal 25 suppresses transmission of the status word 38.

The instrumentation bit 40 (10) differentiates a command word 36 form a status word 38, because both have the same sync pattern. The instrumentation bit 40 in a status word 38 is always set to "0". When used, the instrumentation bit 40 in a command word 36 is always set to "1". Since the instrumentation bit 40 is the most significant bit 40 of the subaddress field, using it as an instrumentation bit 40 reduces the number of available subaddresses from 30 to 15. Because of this limitation, many systems may use other techniques to differentiate between command words 36 and status words 38.

The service request bit 40 (11) enables a terminal to inform the bus controller 24 that it needs to be serviced. A "1" in this bit 40 indicates that service is needed. The service request bit 40 is typically used when the bus controller 24 is polling the remote terminals 25.

Bits 40 (numbered 12-14) are reserved for future use and must be set to "0". Any other value is an error 93.

A "1" in bit 40 (15) indicates that the remote terminal 25 received a valid broadcast command. When a remote terminal 25 receives a valid broadcast command, the remote terminal 25 sets this bit 40 to "1" and suppresses transmission of its status word 38.

A "1" in Bit 40 (16)("busy" bit 40) tells the bus controller 24 that the remote terminal 25 terminal 25 cannot act on a command to move data between the remote terminal 25 and a subsystem. This bit 40 is typically not used in modern system designs and is discouraged by Notice 2 of the 1553 standard.

A "1" in bit 40 (17) is used as an indicator of existence of a fault in a subsystem. A "1" in bit 40 (18) indicates that the remote terminal 25 has received a mode code and has accepted control of the bus 20. After setting this bit 40, the remote terminal 25 becomes the bus controller 24.

A "1" in bit 40 (19)(the terminal flag) indicates to the bus controller 24 that a fault exists in the remote terminal 25 hardware.

Any device that is not a bus controller 24 or a bus monitor 26 is, by definition, a remote terminal 25. A remote terminal 25 can be used as an interface between the bus(es) 20 and a subsystem or as a connector between that bus 20 and another 1553 bus 20. A subsystem is the sender or user of the information transferred on the bus 20. A remote terminal 25 contains all the components needed to transfer the data from the sender source to the decoder 28.

The bus controller 24 manages the flow of data on the buses 20. More particularly, only one bus controller 24 can be active at a given time. A bus controller 24 may be one of three types: word controller, message controller, or a frame controller. A word controller, handles one word 30 at a time. A word controller, is seldom used due to the processing burden it places on the subsystem. A message controller handles one message at a time, interacting with the computer only when a message is complete or when a fault occurs. A frame controller can process multiple messages in a defined sequence, interrupting the computer only when the message stream is complete or after an error 93 is detected. The bus controller 24 has five types of messages: data, transmit data, broadcast data, mode code and remote terminal 25 to remote terminal 25 transfer. Each method costs of 16-bit 40 words 30 or more, command status or data with a 3 microsecond pulse 51 pause.

Each IO board has 2 channels. Each channel is a complete 1553 system with Side A and Side B. Each channel can be configured as a BC 24, RT 25 or MT. A BC 24 or RT 25 can have an optional MT channel without changing the BC 24 or RT 25 functionality. MT allows one to see what is on the bus 20 for any specified RT 25 or for all bus 20 traffic.

A 1553 transceiver sends differential 1553 bus 20 signals as digital output signals. One signal (RX_DATA) indicates when the original 1553 signal is above ground and the other (RX_DATA_N) indicates when the 1553 signal is below ground. This two line output becomes an input to the decoder 28 of the present invention.

Referring to FIG. 5 additional potential input signals to the 1553 decoder 28 of the present invention are shown. These input signals are used in various operations as necessary to carry out FPGA operations.

Figure 6:
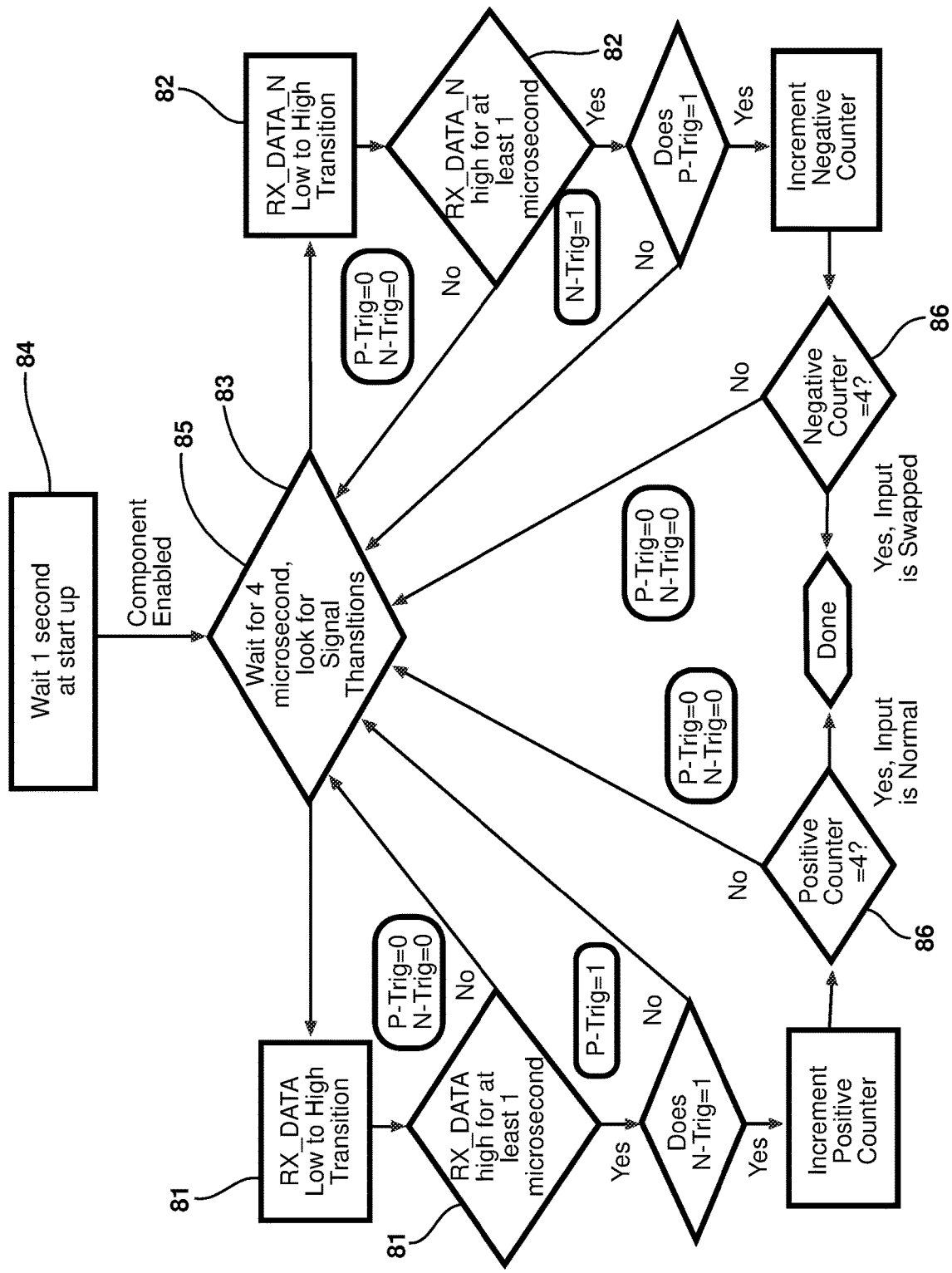
FIG. 6 is a flow chart of optional polarity and fixing safeguards.

Referring to FIG. 6, the present invention may optionally incorporate polarity checking and fixing safeguards. Under protocol, all 1553 messaging starts with a sync pulse 51 which is indicated by the RX_DATA signal going high. This sync pulse 51 is an indicator that the polarity of the cables is correct, provided that the decoder 28 does not start in the middle of a communication packet or there are no start up glitches.

The first safeguard is a power up enable. Under this safeguard, the power up is only enabled after system clock 50SY has started and triggered a timer to run for 1 second. This first safeguard allows the system to boot to a stable state 52 before looking at the incoming data. Afterwards, a second safeguard activates. The second safeguard is a 4 microsecond timer which restarts if any activity is seen on either the RX_DATA or RX_DATA_N. The first safeguard and second safeguard ensure that the decoder 28 is not starting to look for a high trigger during the middle of a message, instead of at the beginning of a message.

Specifically, the decoder 28 looks for 4 microseconds of inactivity, then a low to high transition on one of the lines, the line remaining high for a minimum of 1 microsecond, a low to high transition on the other line, and the other line staying high for a minimum of 1 microsecond. These consecutive steps are indications of a MIL-STD-1553 sync being correctly identified. These steps are repeated for 4 consecutive iterations. If the decoder 28 sees correct sync for 4 consecutive iterations with the RX_DATA going high first, the component recognizes the polarity to be normal and locks that polarity. If the decoder 28 sees the RX_DATA_N going high first for 4 consecutive iterations, the component corrects the polarity before forwarding the signals.

Figure 7:
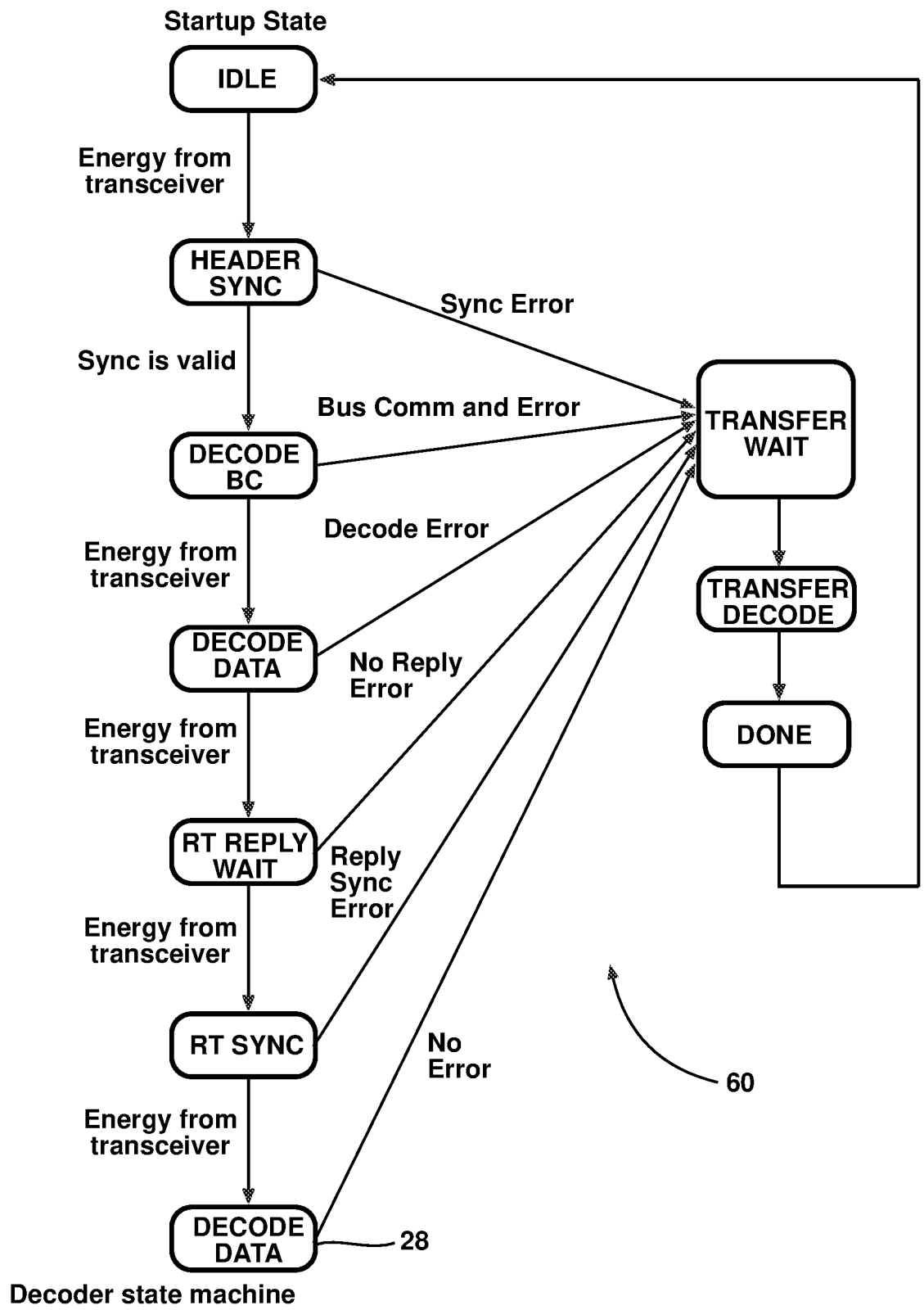
FIG. 7 is a decoder state machine according to the present invention.

Referring to FIG. 7 and FIG. 8, the decoder 28 is controlled by a state machine 60. The state machine 60 has at least eight operable states 62. The state machine 60 is triggered by an active high signal from either of the 2 input signals from the transceiver; RX_DATA or RX_DATA_N. However, safeguard 2 fixes any polarity issues with the inputs which means the state machine 60 should only be started by a low to high transition of RX_DATA.

The state machine 60 is at idle in a startup state 62 until the state machine 60 receives energy from the transceiver and performs a header sync. If the sync is valid, the state machine 60 performs a decoding of the bus 20 command. The decoded bus 20 command is then used to perform a decoding of the data. The decoded data are sent to perform a RT 25 reply wait function. Upon the performing the wait, the state machine 60 performs a RT 25 sync. The output of the RT 25 sync is decoded data. At any step, if there is a sync error 93, bus 20 command error 93, decode error 93, no reply error 93, reply synch error 93 the signal is sent directly to the transfer wait function upon detection of that respective error 93. If there is no error 93, the signal is then sent to the transfer wait function upon completion of the pervious steps. At the conclusion of the transfer wait function the signal is sent to perform a transfer decode function and the decoding step is done. The loop may then be repeated as necessary.

Referring to FIG. 9, the decoder 28 may use a RAM block 91, such as 44×32 RAM block 91 to store decoded data. Decoded data are pushed out of the decoder 28 using the order as shown.

When a bit 40 is found, the value is shifted into a 20 bit 40 shift register. Each 1553 word 30 consists of 20 bits 40, 3 for the sync, 16 for the data and 1 for parity. When an entire word 30 has been received, those 20 bits 40 are sent to address 20 of the block RAM. Each time a word 30 is received, the next location of the block RAM is populated. The BC 24/RT 25 messages can contain up to 32 words 30. If fewer words 30 are received, the remaining address locations of the block RAM is populated with 0xFFFFF.

Regarding timestamps 53, the decoder 28 can take a variable timestamp 53 of up to 40 bits 40. This timestamp 53 will be sampled with the rising edge of the signals from the transceiver during the IDLE state 62 and during the REPLY_WAIT state 62. The traditional method of measuring the reply time is to start a timer at the transition of the last bit 40 from the bus controller 24 and stop the timer at the beginning of the first bit 40 of the RT 25 response. But such method of measuring the timing is may be imprecise due to the asynchronous clocks 50SY, 50AN of the bus controller 24 and remote terminal 25.

The decoder 28 of the present invention uses a more stable and advantageous method of subtracting the RT's 25 timestamp 53 and a relative constant from the bus controller's 24 timestamp 53 than is found in the prior art. The relative constant is calculated by the length of time it should take the bus controller 24 to transmit the number of bits 40 in the command message. For instance if the bus controller 24 command is a receive 20 word 30 command, the reply time is given by:

$$RC=(FTM*(20+(WC*20)))  \quad \text{Eq. 1A}$$

where RC is the relative constant, FTM is the 1553 data rate of 1000 nanoseconds and WC is the word 30 count, and $$\text{Reply Time}=BCTS-RTTS-RC \quad \text{Eq. 1B.}$$

where (BCTS=bus controller 24 timestamp 53, RTTS=remote terminal 25 timestamp 53, FTM=sample rate, WC=word 30 count). For this example the timestamp 53 has step sizes of 5 nanoseconds. Therefore the reply time would also be in nanoseconds.

Tail off is an anomaly which may occur when there is an imbalance between the positive pulses 51 and negative pulses 51 in a BC 24/RT 25 message. The positive bits 40 and negative bits 40 of the BC 24/RT 25 message are designed in such a way that there should be no remaining energy on the transformers at the end of a message. The number of the positive pulses 51 and negative pulses 51 should be equal. When the number is unequal, the energy remaining in the transformer of the transmitting LRU may ring, causing tail off. The present invention may optionally include a tail off detector and method of quantitatively measuring and reporting the tail off.

At the end of a RT 25 response during the TRANSFER_WAIT state 62, a counter increments if either the RX_DATA or RX_DATA_N is high. This state 62 of either the RX_DATA or RX_DATA_N signal being high indicates tail off. The timer will only increment for a total of 4 microseconds because there could be another BC 24 command at the end of that time period according to 1553.

If tail off is indicated according to the above method and there are no message errors 93, the indication and length of the tail off is reported in the field designated for the error 93 codes. The 8 bit 40 error 93 code field normally starts with an "E", but the indication of tail off replaces the "E" with an "A". The type of error 93 would encompass the remaining 4 bits 40. However since there are no message errors 93, the type of error 93 is replaced with the measured length of the tail off. Therefore, the maximum tail off time would be 0xF or decimal 15.

Due to the bit 40 field only having 4 bits 40 for reporting a measurement and the exemplary 10 MHz clock speed, the measurement constrains of the tail off, which could be 1500 nanoseconds. Such time period is insufficient to measure across the minimum inter-message gap of 4 microseconds, so the process divides the tail off measurement by 3. Therefore, the reported tail off of 0xAF would be 15×3 or 4500 nanoseconds (4.5 microseconds).

Figure 10:
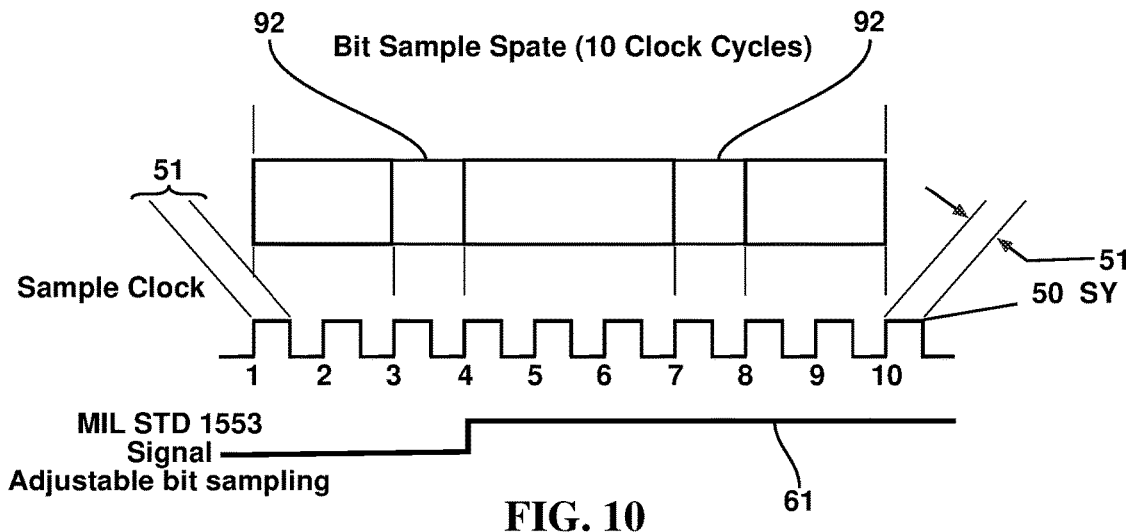
FIG. 10 is a bit sample space for 10 clock cycles.

Referring to FIG. 10, the decoder 28 component logic operates on a clock 50 having a clock 50 rate of less than 15 MHz, less than 14 MHz, less than 13 MHz, less than 12 MHz, less than 11 MHz, about 10 MHz and at least 9.99 MHz, preferably 8 MHz to 12 MHz, and more preferably 10.0 MHz. By way of non-limiting example, in a 10 MHz clock 50, there are only 10 clock 50 transitions to find the bit 40 transition of the incoming data because the data rate is 1 MHz. The prior art requires 40 clock 50 transitions to find the bit 40 transition of the incoming data because the data rate is 1 MHz. If the clock 50 of either the bus controller 24 or RT 25 has excessive drift relative to the system running the decoder 28, bit 40 transitions can be missed.

To compensate for the clock 50 rate of the sample clock 50 according to the present invention, in the nonlimiting example of a 10 MHz clock 50, the decoder 28 aligns the 10 MHz system clock 50SY cycle sampling window 92 to the sync pattern at the beginning of each concurrent word 30 of the message. The state machine 60 then uses a narrow sliding window 92 of 4 bit 40 times which is initially centered in the 10 MHz clock 50SY cycle. The state machine 60 then uses the sliding window 92 with a 2 sample clock 50 buffer at the start and end of the window 92 to detect the bit 40 transition.

This narrow window 92 slides forwards or backwards based on the identified location of the signal transition. However, there is a fixed 2 sample clock 50 guard time at the start and end of the 10 MHz clock 50SY cycle sampling window 92. The state machine 60 aligns the 10 sample clock 50SY to each successive sync pattern. The window 92 recalibrates after every bit 40 transition when looking for the next bit 40 transition.

The decoding process of the present invention seeks a logic transition on either the RX DATA signal or the RX_DATA_N signal. If the transition occurs on the RX DATA signal, a '0' is registered. If the transition occurs on the RX_DATA_N signal, a '1' is registered. The code looks for a transition over a configured window 92 length because the transmit clock 50 or receive clock 50 can be misaligned and/or drift. The process registers an error 93 flag if a bit 40 transition during the window 92 is not found.

The window 92 in which to find a signal transition is adjustable because the transmitter clock 50 is asynchronous and can float. The window 92 is adjusted on the first bit 40 that is decoded. The counter is then set to a specific window 92 size of 10, and is restarted when a bit 40 is found. Each following bit 40 transition should be within a window 92 of +/−2 clocks 50.

Figure 11:
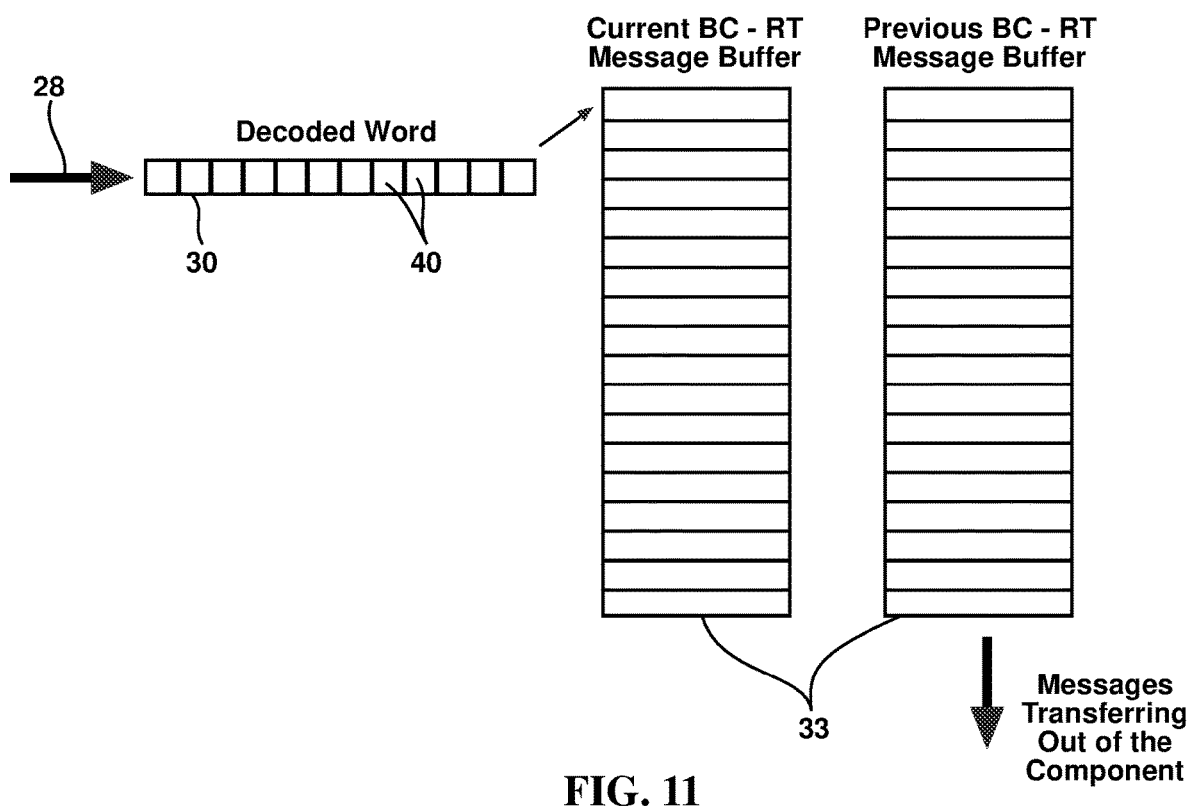
FIG. 11 is a diagram of bit registers usable with the present invention.

Referring to FIG. 11, when a bit 40 transition is found within the search window 92, the value of '1' or '0' is shifted into the lowest bit 40 of a 20 bit 40 shift register. Once an entire 20 bit 40 word 30 according to 1553 has been received, those bits 40 are sent to the RAM block 91. Then, according to 1553 the next 20 bit 40 word 30 will then begin populating the shift register.

Figures 12, 13:
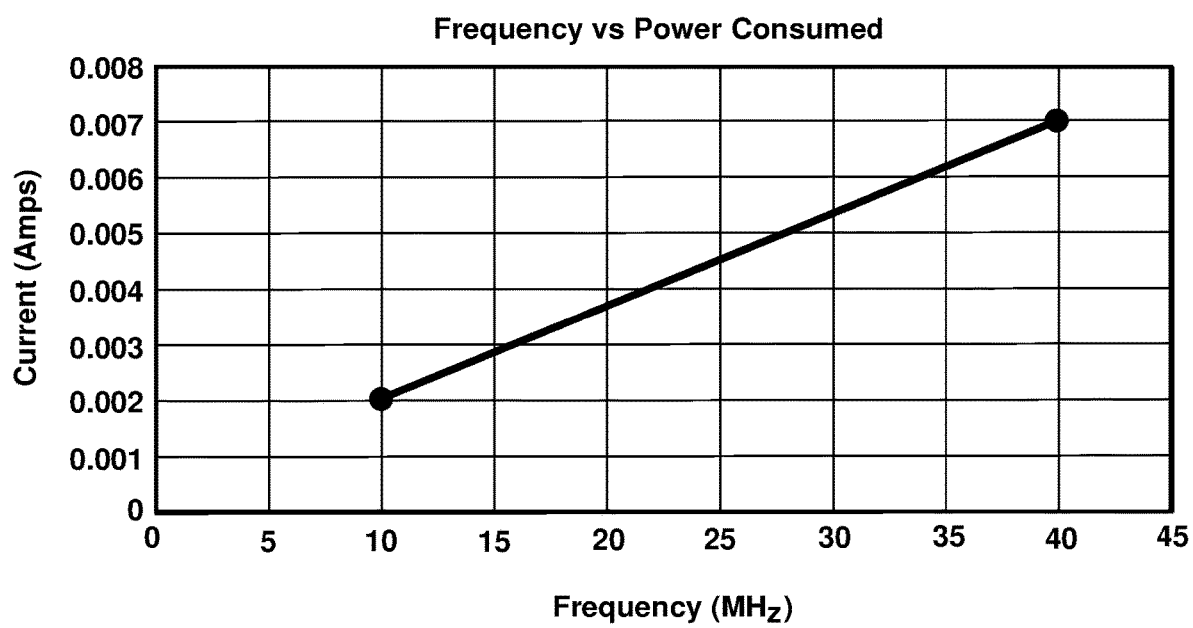
FIG. 12 is a table of error codes according to the present invention.
FIG. 13 is a graphical representation of the low clock rate clock according to the present invention as compared to a control.

Referring to FIG. 12, as relates to error 93 handling the decoder 28 packages the BC 24 to RT 25 interaction into a fixed size. If there are errors 93 in the decoding of the signal, the sequence of the output does not change. All information obtained during the decode process which has populated the table leaves the decoder 28. If an error 93 occurs during the states 62, the state machine 60 switches to the TRANSFER_WAIT state 62, then to the Transfer Decode state 62. During the Transfer Decode state 62, all decoded data will be sent out of the component along with the error 93 code, if any.

Several error 93 conditions may exist such as: bad bus controller 24 synchronization pulse 51, bad RT 25 synchronization pulse 51, incomplete bus controller 24 message, incomplete RT 25 response, the wrong number of words 30 being returned by the RT 25 and missing bit 40 transition.

Referring to FIG. 13, the present invention was instantiated as a component in a Artix7 field programmable gate array (FPGA) 27 chipset from Xilinx Inc. of San Jose, CA along with other components to test and prove the functionality of the present invention. The power consumption of the individual parts of the state machine 60 instantiated in the FPGA was predicted using the Xilinx's VIVADO® Design Suite software, which creates the firmware from the state machine 60 design to program the FPGA.

For this experiment the clock 50 speed was varied between two separate FPGA implementation builds with to test the difference in power consumption. The implemented design uses four parallel copies of the decoder 28 to support four separate 1553 inputs. The results show the power consumption of the four instantiated "Bus_Decoder_1553" running at 10 MHz in the FPGA design to be 0.002 Watts each. The results also show the power consumption of the four decoders 28 running at 40 MHz in the FPGA design to be 0.007 Watts each. This experiment demonstrates that the exemplary 10 MHz slower clock 50 rate reduces power consumption within the FPGA by 70% relative to the 40 MHz control.

The lower power consumption advantageously reduces power consumption, extending battery life and reducing thermal load. Furthermore, the slower clock 50 speed allow a wider variety of components to be used with the system.

In another embodiment the invention comprises a method of capturing timestamps 53 for signals with a higher precision than resolution of the system clock 50SY. According to the prior art, timestamps were generated by an adder circuit continuously incremented by the system clock 50SY. According to the prior art, a typical implantation would be a system clock 50SY of 100 MHz incrementing an adder circuit with a maximum timestamp 53 precision of 1/100 MHz or 10 nanoseconds (ns). To enable a more precise timestamp 53, the system clock 50SY had to be increased in order to create a faster adder circuit. However, as the speeds of system clocks 50SY increase, amplitude degradation increases exponentially due to physical circuit card features such as transistor size and line lengths between devices.

Figure 14:
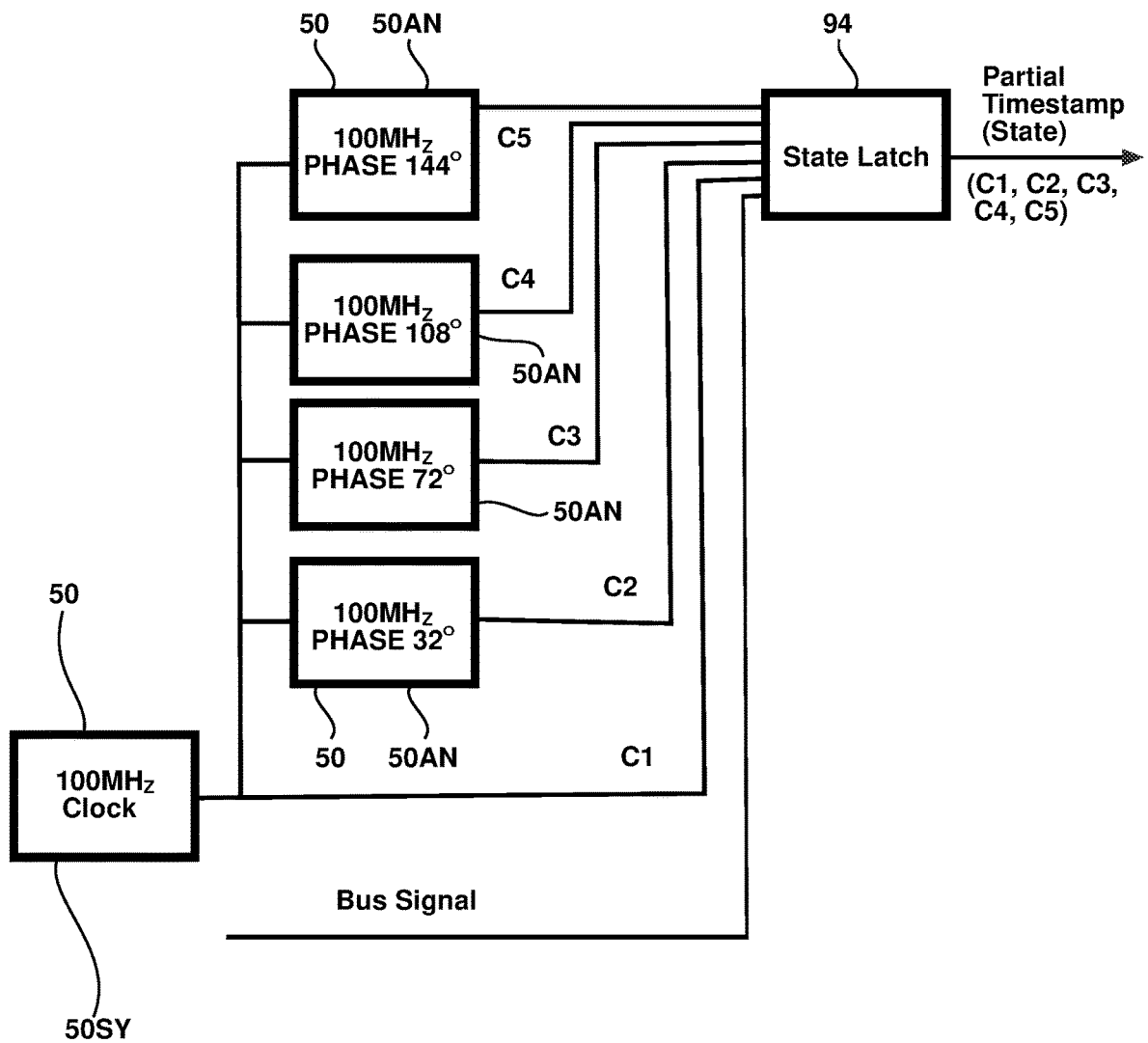
FIG. 14 is a flow chart of high frequency timestamp implementation according to an aspect of the present invention.

Referring to FIG. 14, the method of generating a timestamp 53 according to the present invention is believed to have a precision at least an order of magnitude greater than according to the prior art adder circuit. The signal to be timestamped is used to capture the state 52 of the out of phase clocks 50AN. The captured states 52 of the out of phase clocks 50AN can then be used to calculate a fractional period of the system clock 50SY.

By way of nonlimiting example, a 125 MHz (period of 8 ns) system clock 50SY can be used to create four 125 MHz clocks 50AN each 36 degrees out of phase with each other. The state 52 of these clocks 50AN (high or low) will create a timestamp 53 with precision that has 8× higher resolution (1 ns compared to that of 8 ns).

To determine the number of clocks 50 to use, the period of the system clock 50SY should be divided by the desired period, divided by 2 and followed by a subtraction of 1 according to:

$$((\text{system clock 50 rate/desired resolution})/2)-1=n \qquad \text{Eq. 2,}$$

where n is the number of ancillary clocks 50AN needed to achieve the desired resolution. For example, if a 100 MHz system clock 50SY is available and the user wants a 1 GHz resolution timestamp 53, 4 ancillary clocks 50AN need to be created from the system clock according to:

$$((10 \text{ ns}/1 \text{ ns})/2)-1=4 \qquad \text{Eq. 3.}$$

For this nonlimiting example, the implementation will have five total clocks 50SY, 50AN (including the system clock 50AN) which will be available with two states 52 each (1 and 0). The phase separation of the clocks 50SY, 50AN can be calculated as the period of the system clock 50SY divided by the number of clock 50 states 52, which is 10 in this example. Therefore, the total phase (360) of the system clock 50SY will be divided by 10. Each clock 50AN is phased 36 degrees out of phase (360/10) from the previous clock 50AN. Once these additional clocks 50AN are generated, the signal to be timestamped is used to provide a latch 94 in the state 52 of all clocks 50SY, 50AN when the signal goes high. Because this signal only provides a fraction clock 50 of the overall system clock 50SY, an adder circuit incremented by the system clock 50SY of 100 MHz may be used to sum the timestamps 53 of the ancillary clocks 50AN. A decoder 28 according to the present invention may have from 3 to 25, 4 to 20, 5 to 15 or 8 to 12 ancillary clocks 50AN.

Referring to FIG. 15, after capturing the state 52 of the clocks 50, the digital state 52 of each clock 50 is then decoded. This partial fractional state 52 of the system clock 50SY can then be added onto the whole valued timestamp 53 being created by the system clock 50SY. For example, if the signal to be timestamped has a latch 94 with a value of C1=0, C2=0, C3=0, C4=1 and C5=1, the value of the partial timestamp 53 is "00011" and therefore the partial clock 50AN is 7 nanoseconds (ns). The 100 MHz system clock 50SY in this nonlimiting example has a period of 10 ns so the timestamp 53 for the signal would be 10 ns+7 ns=17 ns. The partial time stamp method according to the present invention provides a timestamp 53 precision of 1 ns, vs 10 ns according to the prior art, using the same system clock 50SY. Prophetically, the only other method to achieve the 1 ns resolution of the present invention would be to use a system clock 50SY of 1 GHz instead of 100 MHz, adding considerable costs and system complexity.

For modern field programmable gate arrays (FPGA) 27, this invention of partial fractional timestamps 53 can be generated using the clock 50 managers. This invention can also be applied to application specific integrated circuits (ASIC). The invention can also be applied to RF circuit card by using phase shifters to generate the necessary phase shifted clocks 50AN.

The timestamp 53 precision of the present invention provides several benefits over increasing the system clock 50SY rate to achieve an equally high precision timestamp 53. For example, one benefit is relatively low clock 50 jitter. Clock 50 stability and phase jitter should be considered when using high frequency clocks 50. That is the higher the clock 50 frequency, the more instability and jitter will be present on the clock 50 signal and can propagate into the algorithm on the circuit card or microchip. But according to the present invention, using the present invention with multiple out of phase ancillary clocks 50AN technique, any jitter in the system clock 50SY advantageously and unexpectedly appears in the out of phase clocks 50AN as well. Thus, the out of phase ancillary clocks 50AN do not introduce additional jitter into the system than what was already present, provided that the signal routing on the circuit design is the same for each out of phase ancillary clock 50.

Another benefit of the present invention over using a higher speed clock 50 is the out of phase lower speed clocks 50 of the present invention can be routed on a circuit card or in a microchip further than a higher speed clock 50. I.e., a 2 GHz clock 50 cannot be routed as far as a 100 MHz clock 50 without many design considerations such as impedance matching and using special materials.

Furthermore, as the frequency of a system clock 50SY increases, the power to generate and drive that clock 50SY likewise necessarily increases. A circuit design which uses a lower frequency clock 50SY for processing and only needs a higher frequency clock 50 to assist in generating a time stamp, consumes much less power than the comparable high frequency system clock 50SY according to the prior art.

The lower end of any range cited herein may be combined, without limitation, with the upper end of any range for that same parameter. In another embodiment the invention comprises a non-transitory computer readable medium suitable for and configured to carry out computations and determinations of any of the foregoing, including only as limited by the claims below, algorithms, calculations, estimates such as but not limited to Kalman estimates, iterative/recursive exercises, solving of equations/inequalities and determinations of any of the parameters listed in the claims below.

The disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computer, netbook computer), microprocessor-based or programmable consumer or industrial electronics, and the like. The illustrated aspects may be practiced in distributed computing environments where tasks are performed by remote processing devices linked through a communications network. In a distributed computing environment, program modules can be located in both local and remote memory storage devices.

Exemplary non-transitory computer readable media are physical, transferable, reproducible, may comprise all computer readable media except for a transitory propagating signal and particularly include flash drives, magnetic strips, optical drives, CDs, DVDs, internal/external hard drives, more particularly internal/external solid state hard drives, and further exclude RAM, volatile memory requiring power for data storage, signals and effervescent carrier waves. In an alternative embodiment, transitory computer readable media may also be used.

Terms such as "store," "storage," "data store," data storage," "database," and substantially any other information storage component relevant to operation and functionality of a component, refer to "memory components," or entities embodied in a "memory" or components comprising the memory. By way of non-limiting illustration, and not limitation, volatile memory, non-volatile memory, disk storage, and memory storage. Further, non-transitory memory can be included in read only memory (ROM), programmable ROM (PROM), electrically programmable ROM (EPROM), electrically erasable ROM (EEPROM), or flash memory. Transitory memory can comprise random access memory (RAM), which acts as external cache memory. By way of non-limiting illustration, RAM is available as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

To the extent that the figures illustrate diagrams of the functional blocks of the various embodiments, the functional blocks are not necessarily indicative of the division between hardware circuitry. Thus, for example, one or more of the functional blocks (e.g., processors or memories) may be implemented in a single piece of hardware (e.g., a signal processor or a block of random access memory, hard disk, or the like) or multiple pieces of hardware. Similarly, the programs may be standalone programs, may be incorporated as subroutines in an operating system, may be functions in an installed software package, and the like. It should be understood that the various embodiments are not limited to the arrangements and instrumentality shown in the drawings.

What is claimed is:

1. A bus decoder of a Military Standard 1553B (MIL-STD-1553B) bus usable for communication between two or more line replaceable units, said bus decoder comprising: a first communication link to a bus controller having an input terminal for receiving two signal outputs of a 1553 transceiver, a first said output signal indicating when a 1553 signal is above ground and a second said output signal indicating when a 1553 signal is below ground; a second communication link to at least one remote terminal; a first RAM buffer and a second RAM buffer, each configured to store and decode one or more respective bus controller to remote terminal interactions, said first RAM buffer and said second RAM buffer being disposed in a ping-pong configuration, whereby said first RAM buffer streams a first bus controller to a first remote terminal interaction from a component while said second RAMbuffer simultaneously decodes a second bus controller to remote terminal interaction; said bus decoder being triggered by an active high signal from either of two input signals from said 1553 transceiver, said bus decoder having a data rate of 1 Mbps and a system clock having a system clock rate ranging from 9.99 MHz to 15.00 MHz with a rising edge and trailing edge, said bus decoder being configured to store decoded information; whereby data output from first said RAM buffer and said second RAM buffer are on said rising edge of said system clock, said data being transmitted with at least 32 bits in parallel starting with a field 0, whereby an active high data valid signal accompanies said data, said bus decoder being further configured to verify a synchronization pattern based upon said MIL-STD-1553B specification to indicate whether or not an incoming signal is a MIL-STD-1553B signal, said system clock having a plurality n of clock states, wherein n is a positive integer greater than 1; and a plurality of n ancillary clocks whereby each said ancillary clock of said plurality of clocks is out of phase with an adjacent ancillary clock by the formula of 360/n degrees, each of said ancillary clocks and said system clock being latchable when a signal to be timestamped goes high as measured at said leading edge to create a plurality of n partial fractional states of said system clock, said plurality of n partial fractional states being summable to provide a system timestamp.

2. A decoder according to claim 1 wherein said decoder has eight states configured as:
   IDLE with no activity;
   HEADER_SYNC which validates a bus controller sync message from a specification;
   DECODE_BC which decodes said bus controller sync message according to said specification;
   DECODE_DATA which decodes a plurality of data words from the bus controller or remote terminal;
   RT_SYNC which validates a timing of a remote terminal sync message;
   RT_REPLY_WAIT which measures a time interval between an end of said bus controller message and a corresponding remote terminal response;
   TRANSFER_WAIT which validates that an external data receiving component is ready,
   TRANSFER DECODE which pushes decoded traffic out of said component; and
   TRANSFER_WAIT which is used if an error occurs during any said preceding state.

3. A decoder according to claim 2 wherein said decoder is configured to send a respective error code with said decoded data.

4. A decoder according to claim 1 wherein said system clock has a system clock rate ranging from 10 MHz to 15 MHz.

5. A decoder according to claim 4 wherein said system clock has a system clock rate ranging from 10 MHz to 12 MHz.

6. A decoder according to claim 4 having a variable timestamp of up to 40 bits.

7. A decoder according to claim 6 wherein said variable timestamp is sampled at a said rising edge of a said signal from said transceiver during said IDLE state and/or during said REPLY_WAIT state.

8. A decoder according to claim 7 wherein said system clock has a system clock rate ranging from 10 MHz to 11 MHz.

9. A bus decoder of a Military Standard 1553B (MIL-STD-1553B) bus usable for communication between two or more line replaceable units, said bus decoder comprising: a first communication link to a bus controller having an input terminal for receiving two signal outputs of a 1553 transceiver, a first said output signal indicating when a 1553 signal is above ground and a second said output signal indicating when a 1553 signal is below ground; a second communication link to at least one remote terminal; a first RAM buffer and a second RAM buffer, each configured to store and decode one or more respective bus controller to remote terminal interactions, said first RAM buffer and said second RAM buffer being disposed in a ping-pong configuration, whereby said first RAM buffer streams a first bus controller to a first remote terminal interaction from a component while said second RAMbuffer simultaneously decodes a second bus controller to remote terminal interaction; said bus decoder being triggered by an active high signal from either of two input signals from said 1553 transceiver, said bus decoder having a data rate of 1 Mbps and a system clock having a system clock rate ranging from 9.99 MHz to 15.00 MHz with a rising edge and a trailing edge, said bus decoder being configured to store decoded information; whereby data output from first said RAM buffer and said second RAM buffer are on said rising edge of said system clock, said data being transmitted with at least 32 bits in parallel starting with a field 0, whereby an active high data valid signal accompanies said data, said bus decoder being further configured to verify a synchronization pattern based upon said MIL-STD-1553B specification to indicate whether or not an incoming signal is a MIL-STD-1553B signal, said system clock having a plurality n of clock states, wherein n is a positive integer greater than 1; said system clock having a clock rate of 10 MHz to 14 MHz, with a rising edge and trailing edge and further having a plurality of n clock states; and a plurality of n ancillary clocks whereby each said clock of said plurality of ancillary clocks is out of phase with an adjacent ancillary clock by the formula of 360/n degrees, each said ancillary clock and said system clock being latchable when a signal to be time-stamped goes high as measured at said leading edge to create a plurality of n partial fractional states of said system clock, said n plurality of partial fractional states being summable to provide a system timestamp.

10. A decoder according to claim 9 wherein said system timestamp has a precision ranging from 1 ns to 5 ns using a system clock having a 10 MHz clock rate.

11. A decoder according to claim 9 wherein said plurality of n partial fractional states are summable with a whole value timestamp created by said system clock to provide said system timestamp.

12. A decoder according to claim 11 having from 4 to 20 ancillary clocks.

13. A decoder according to claim 12 wherein the number of n plural ancillary clocks is selected according to the formula:

$$((\text{system clock rate}/\text{desired resolution})/2)-1=n.$$

14. A Military Standard 1553B (MIL-STD-1553B) compatible bus controller meeting MIL-STD-1553B specifications and being suitable for communication between two or more line replaceable units, said bus controller comprising: a communication link having an input terminal for receiving a two line, two signal output from a 1553 transceiver, a first output signal indicating when a 1553 signal is above ground and a second output signal indicating when a 1553 signal is below ground; a first plurality of remote terminals; a coupling node in communication with each said remote terminal of said plurality of remote terminals, each said coupling node being one of a direct coupling or a transformer coupling; and a first RAM buffer and a second RAM buffer, each configured to store and decode one or more respective bus controllers to remote terminal interactions, said first RAM buffer and said second RAM buffer being disposed in a ping-pong configuration whereby said first RAM buffer streams a first bus controller to remote terminal interaction from a component while said second RAMbuffer is simultaneously decodes a second bus controller to remote terminal interaction; a bus decoder triggered by an active high signal from either of two input signals from said transceiver and having a data rate of 1 Mbps and a system clock having a system clock rate ranging from 10 MHz to 15 MHz with a rising edge and a trailing edge, the bus decoder being configured to store decoded information; whereby data output from said first RAM buffer and said second RAM buffer are on said rising edge of said clock, said data being transmitted with at least 32 bits in parallel starting with a field 0, whereby an active high data valid signal accompanies said data output, said decoder being further configured to verify a synchronization pattern based upon said MIL-STD-1553B specification to indicate whether or not an incoming signal is a MIL-STD-1553B signal, said system clock having a plurality n of clock states, wherein n is a positive integer greater than 1; and a plurality of n ancillary clocks whereby each said ancillary clock of said plurality of clocks is out of phase with an adjacent ancillary clock by the formula of 360/n degrees, each said ancillary clocks and said system clock being latchable when a signal to be time-stamped goes high as measured at said leading edge to create a plurality of n partial fractional states of said system clock, said plurality of n partial fractional states being summable to provide a system timestamp.

15. A bus controller according to claim 14 wherein timestamp has a precision ranging from 1 ns to 5 ns using a system clock having a 10 MHz clock rate.

16. A bus controller to claim 15 having a plurality of ancillary clocks with a clock rate of 8 MHz to 12 MHz.

17. A bus controller according to claim 16 having a plurality of ancillary clocks with a clock rate of 10 MHz.

18. A bus controller to claim 14 having a plurality of ancillary clocks with a clock rate of 8 MHz to 12 MHz.

* * * * *